United States Patent
Skinner et al.

(10) Patent No.: US 6,747,743 B2
(45) Date of Patent: Jun. 8, 2004

(54) MULTI-PARAMETER INTERFEROMETRIC FIBER OPTIC SENSOR

(75) Inventors: Neal G. Skinner, Lewisville, TX (US); John R. Dennis, Bozeman, MT (US); Michel LeBlanc, Oakton, VA (US)

(73) Assignee: Halliburton Energy Services, Inc., Dallas, TX (US)

( * ) Notice: Subject to any disclaimer, the term of this patent is extended or adjusted under 35 U.S.C. 154(b) by 224 days.

(21) Appl. No.: 10/008,503

(22) Filed: Nov. 8, 2001

(65) Prior Publication Data

US 2002/0057436 A1 May 16, 2002

(30) Foreign Application Priority Data

Nov. 10, 2000 (US) .................. PCT/US00/30901

(51) Int. Cl.[7] ................................................. G01B 9/02
(52) U.S. Cl. ...................................................... 356/477
(58) Field of Search .................................. 356/477, 478, 356/483; 250/227.19, 227.27; 367/149

(56) References Cited

U.S. PATENT DOCUMENTS

| | | | |
|---|---|---|---|
| 4,552,457 A | | 11/1985 | Giallorenzi et al. |
| 4,589,285 A | | 5/1986 | Savit |
| 5,001,337 A | * | 3/1991 | Homuth ................. 356/483 |
| 5,401,956 A | | 3/1995 | Dunphy et al. |
| 5,748,312 A | * | 5/1998 | Kersey et al. ........... 356/478 |
| 5,798,834 A | | 8/1998 | Brooker |

* cited by examiner

*Primary Examiner*—Samuel A. Turner
(74) *Attorney, Agent, or Firm*—Marlin R. Smith

(57) ABSTRACT

A fiber optic sensor system permits multiple parameters to be sensed using a single sensor. In a described embodiment, a method of sensing multiple parameters is provided in which an interferometric fiber optic sensor is connected to a variable wavelength light source. Light is transmitted from the light source through the sensor, with the light being swept over a range of wavelengths to measure relatively low frequency signals, and the light being maintained at a constant wavelength to measure relatively high frequency signals.

25 Claims, 2 Drawing Sheets

MULTI-PARAMETER INTERFEROMETRIC FIBER OPTIC SENSOR

CROSS-REFERENCE TO RELATED APPLICATION

This application claims the benefit under 35 USC§119 of the filing date of PCT Application No. PCT/US00/30901, filed Nov. 10, 2000, the disclosure of which is incorporated herein by this reference.

BACKGROUND

The present invention relates generally to fiber optic sensors and, in an embodiment described herein, more particularly provides a method of sensing multiple parameters in a well using a single sensor.

Pressure signals have been measured in subterranean well for many years. These pressure signals may be relatively low frequency, such as pressures monitored during production logging, drill stem testing, well monitoring, etc. These pressures change relatively slowly. Other pressure signals are relatively high frequency, such as pressure signals used in acoustic telemetry, etc., which may have frequencies from many hertz to many kilohertz.

Present sensors used for measuring these pressure signals are typically designed for measuring only low frequency signals or only high frequency signals. If it is desired to measure both low frequency and high frequency signals, then at least two sensors must be used. This circumstance occurs, for example, in operations where acoustic telemetry is used for communication and pressure transducers are used for monitoring well pressure in the same operation.

It would, therefore, be advantageous to be able to use a single sensor to measure multiple parameters, such as low and high frequency pressure signals.

SUMMARY

In carrying out the principles of the present invention, in accordance with an embodiment thereof, a method of sensing multiple parameters is provided which solves the above problem in the art. A fiber optic sensor system is also provided for use in the method.

In one aspect of the invention, a relatively low frequency signal is measured by transmitting light from a light source through a fiber optic sensor. The light is swept over a range of wavelengths. A relatively high frequency signal is also measured by transmitting light from the light source through the sensor at a constant wavelength.

In another aspect of the invention, the light source is a tunable laser and the fiber optic sensor is an interferometric sensor, for example, using a Mach-Zehnder or Michelson interferometer. The sensor has two optical paths. One of the optical paths changes in length in response to a change in a signal, such as pressure, applied to the sensor.

In a further aspect of the invention, an optical output of the sensor is input to a computer via an opto-electric converter. The computer controls the wavelength output of the light source.

In yet another aspect of the invention, multiple sensors may be connected to the light source to measure signals at each of the sensors.

These and other features, advantages, benefits and objects of the present invention will become apparent to one of ordinary skill in the art upon careful consideration of the detailed description of a representative embodiment of the invention hereinbelow and the accompanying drawings.

DETAILED DESCRIPTION

Figure 1:
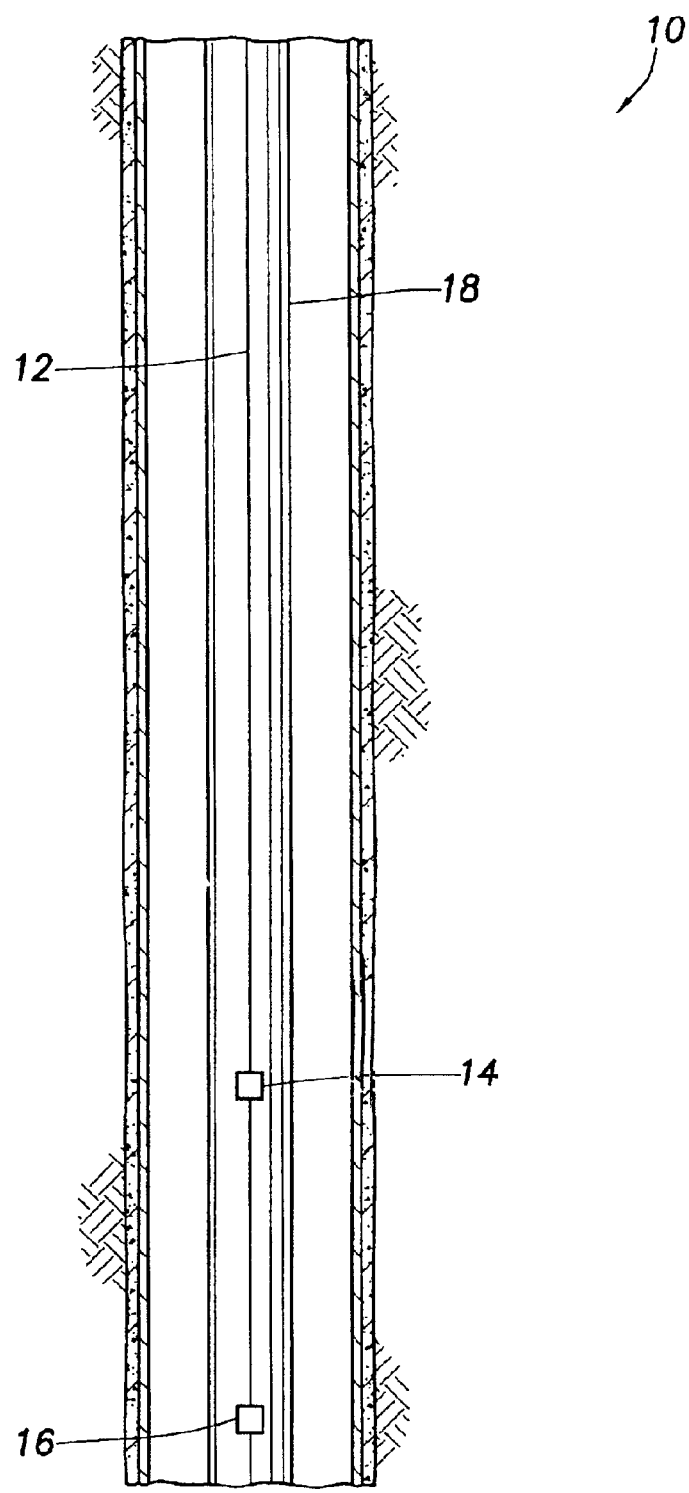
FIG. 1 is a schematic view of a method embodying principles of the present invention.

Representatively illustrated in FIG. 1 is a method 1o which embodies principles of the present invention. In the following description of the method 10 and other apparatus and methods described herein, directional terms, such as "above", "below", "upper", "lower", etc., are used only for convenience in referring to the accompanying drawings. Additionally, it is to be understood that the various embodiments of the present invention described herein may be utilized in various orientations, such as inclined, inverted, horizontal, vertical, etc., and in various configurations, without departing from the principles of the present invention.

In the method 10, fiber optic lines 12 are connected to interferometric sensors 14, 16 positioned in a subterranean well. Only two of the sensors 14, 16 are depicted in FIG. 1 as being conveyed into the well as part of a tubing string 18, but it is to be clearly understood that the sensors could be otherwise conveyed and positioned in the well, and any number of sensors could be used, without departing from the principles of the present invention.

The sensors 14, 16 are used in the method 1o to sense multiple parameters, such as both relatively low frequency and relatively high frequency pressure signals at each sensor. The sensors 14, 16 may be distributed within the well at any locations where it is desired to measure these parameters. It is to be clearly understood, however, that the principles of the invention are not limited to measuring pressure signals. Other types of signals may be measured using interferometric sensors. As used herein, the term "signal" encompasses any variable parameter which may be measured. For example, changes in temperature may be measured using interferometric sensors, in keeping with the principles of the present invention.

Figure 2:
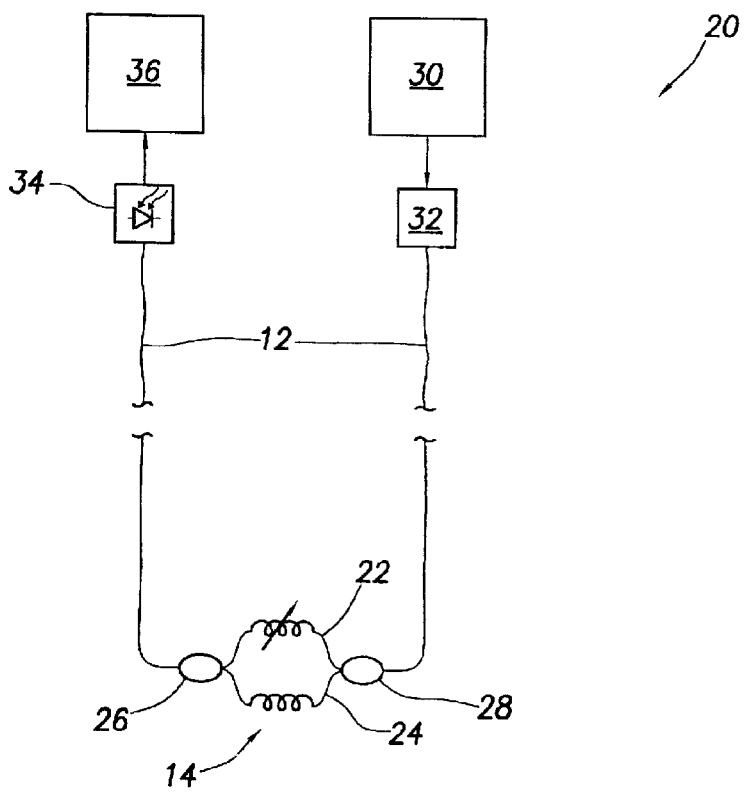
FIG. 2 is a schematic block diagram of a fiber optic sensor system embodying principles of the present invention, and which may be used in the method of FIG. 1.

Referring additionally now to FIG. 2, a fiber optic sensor system 20 embodying principles of the present invention is schematically and representatively illustrated. The sensor system 20 may be used in the method 10 of FIG. 1. Thus, elements of the sensor system 20 which are similar to those previously described are indicated in FIG. 2 using the same reference numbers.

Only one sensor 14 is depicted in FIG. 2 for illustrative clarity, However, it is to be understood that any number of sensors may be used in the sensor system 20, for measuring relatively low and relatively high pressure signals at each sensor.

The sensor 14 in the sensor system 20 is depicted in FIG. 2 as including a Mach-Zehnder interferometer, well known to those skilled in the art. The sensor 14 has two optical paths 22, 24 extending between two optical couplers 26, 28. An optical path length of the path 22 changes in response to a change in pressure applied to the sensor 14. For example, the path 22 may be attached to a structure, such as a cylinder or membrane, etc., which experiences a strain when pressure is applied thereto. A change of strain in the structure produces an associated change of optical path length for the path 22.

Light is transmitted through the sensor 14 by means of a light source, such as a tunable laser 30, which may have an isolator 32 associated therewith. Light from the laser 30 is transmitted through one of the fiber optic lines 12 to the coupler 28, where it is split between the two paths 22, 24. After traversing the paths 22, 24, the light is recombined in the coupler 26.

The amplitude of the light output from the coupler 26 depends upon the relationship between the phases of the light received from the paths 22, 24 at the coupler 26. The relative phases of the light received from the paths 22, 24 depends upon the difference in optical path lengths. Therefore, the amplitude of the light output from the coupler 26 may be related to the pressure applied to the sensor 14.

Note that the above description of the sensor 14 is based on the sensor being provided as a Mach-Zehnder sensor. It is, however, to be clearly understood that other types of sensors may be utilized. For example, the sensor 14 may be a Michelson, Fabry-Perot, or other type of sensor.

The light output from the coupler 26 is transmitted via another of the fiber optic lines 12 to an opto-electric converter 34, such as a photodiode or photo voltaic device, etc. The converter 34 converts the optical signal output from the sensor 14 to an electrical signal for input to a computer 36. The computer 36 may be used to analyze the sensor 14 output and to control the laser 30.

When it is desired to measure a relatively low frequency pressure signal with the sensor 14, the computer 36 directs the laser 30 to transmit light having a sweep of wavelengths through the sensor. The amplitude of the optical output of the sensor 14 is dependent upon the wavelength of the light transmitted through the sensor and the pressure applied to the sensor. The computer 36 determines the relationship between the sensor 14 optical output and the swept range of wavelengths, that is, the optical output amplitude as a function of wavelength, thereby enabling a calculation of the pressure applied to the sensor.

When it is desired to measure a relatively high frequency pressure signal with the sensor 14, the computer directs the laser 30 to transmit light having a constant wavelength through the sensor. The optical output of the sensor 14 varies in frequency and amplitude in response to the varied frequency and amplitude of the pressure signal applied to the sensor. The computer 36 may be used to interpret and/or store the sensor output.

Note that the computer 36 may be used to direct the laser 30 to alternately transmit wavelength sweeps and a constant wavelength through the sensor 14, in order to alternately sense low frequency and high frequency pressure signals. However, it is to be clearly understood that it is not necessary for a wavelength sweep transmission to be followed by a constant wavelength transmission, or vice versa, since a wavelength sweep transmission may be performed at any time it is desired to measure a low frequency pressure signal and a constant wavelength transmission may be performed at any time it is desired to measure a high frequency pressure signal.

Figure 3:
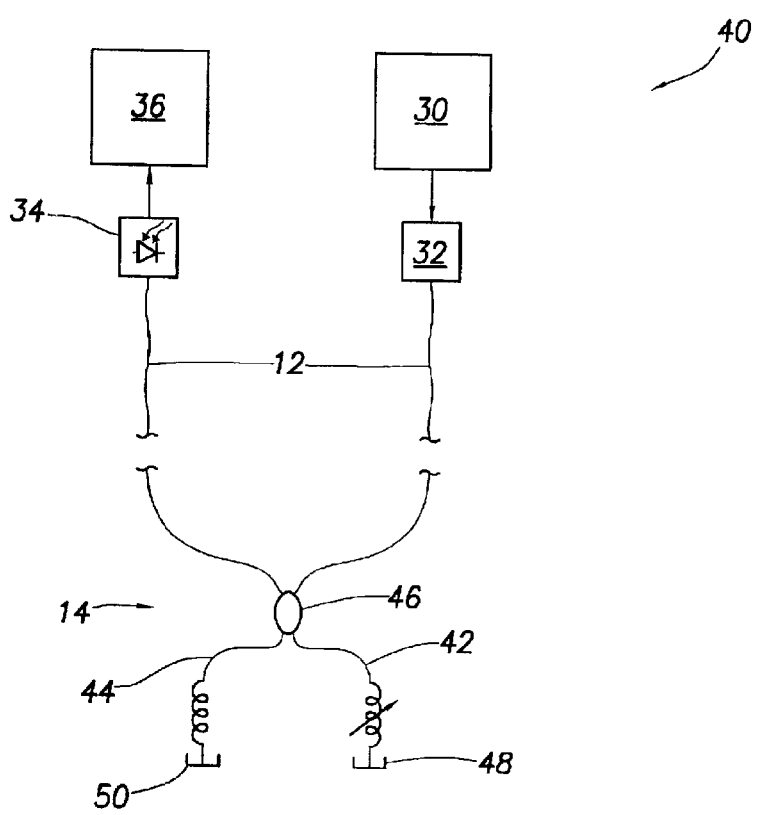
FIG. 3 is a schematic block diagram of another fiber optic sensor system embodying principles of the present invention, and which may be used in the method of FIG. 1.

Referring additionally now to FIG. 3, a fiber optic sensor system 40 embodying principles of the present invention is schematically and representatively illustrated. The sensor system 40 may be used in the method 10 of FIG. 1. The sensor system 40 is similar in many respects to the sensor system 20 described above, but differs in at least one respect in that it utilizes a Michelson interferometer in a sensor to measure multiple parameters. Elements of the sensor system 40 which are similar to those previously described are indicated in FIG. 3 using the same reference numbers.

Only one sensor 14 is depicted in FIG. 3 for illustrative clarity, However, it is to be understood that any number of sensors may be used in the sensor system 40, for measuring relatively low and relatively high pressure signals at each sensor.

The sensor 14 in the sensor system 40 is depicted in FIG. 3 as including a Michelson interferometer, well known to those skilled in the art. The sensor 14 has two optical paths 42, 44 extending between an optical coupler 46 and mirrors 48, 50 at ends of the respective paths. An optical path length of the path 42 changes in response to a change in pressure applied to the sensor 14 For example, the path 42 may be attached to a structure, such as a cylinder or membrane, etc., which experiences a strain when pressure is applied thereto. A change of strain in the structure produces an associated change of optical path length for the path 42.

Light is transmitted through the sensor 14 by means of a light source, such as the tunable laser 30, which may have the isolator 32 associated therewith. Light from the laser 30 is transmitted through one of the fiber optic lines 12 to the coupler 46, where it is split between the two paths 42, 44. After traversing the paths 42, 44, being reflected by the mirrors 48, 50, and again traversing the paths in an opposite direction, the light is recombined in the coupler 46.

The amplitude of the light output from the coupler 46 depends upon the relationship between the phases of the light received from the paths 42, 44 at the coupler 46. The relative phases of the light received from the paths 42, 44 depends upon the difference in optical path lengths. Therefore, the amplitude of the light output from the coupler 46 may be related to the pressure applied to the sensor 14.

The light output from the coupler 46 is transmitted via another of the fiber optic lines 12 to the opto-electric converter 34, which converts the optical signal output from the sensor 14 to an electrical signal for input to a computer 36. The computer 36 may be used to analyze the sensor 14 output and to control the laser 30, as described above, for measuring relatively low frequency and relatively high frequency pressure signals.

Of course, a person skilled in the art would, upon a careful consideration of the above description of representative embodiments of the invention, readily appreciate that many modifications, additions, substitutions, deletions, and other changes may be made to the specific embodiments, and such changes are contemplated by the principles of the present invention. Accordingly, the foregoing detailed description is to be clearly understood as being given by way of illustration and example only, the spirit and scope of the present invention being limited solely by the appended claims.

What is claimed is:

1. A method of sensing multiple parameters, comprising the steps of:

providing an interferometric fiber optic sensor;

connecting a variable wavelength light source to the sensor;

measuring a relatively low frequency signal by transmitting light from the light source through the sensor, the light output from the light source being swept over a range of wavelengths; and measuring a relatively high frequency signal by transmitting light from the light source through the sensor, the light output from the light source being maintained at a relatively constant wavelength.

2. The method according to claim 1, wherein in the providing step, the fiber optic sensor is an interferometric sensor having two optical paths, one of the optical paths changing in length in response to a change in a parameter sensed by the sensor.

3. The method according to claim 2, wherein the interferometric sensor includes a selected one of a Mach-Zehnder interferometer and a Michelson interferometer.

4. The method according to claim 1, wherein in the connecting step, the light source is a tunable laser.

5. The method according to claim 1, wherein the low frequency signal measuring step further comprises determining a relationship between an optical output of the sensor and the swept range of wavelengths.

6. The method according to claim 5, wherein the determining step further comprises determining an amplitude of the optical output as a function of wavelength.

7. The method according to claim 1, wherein the high frequency signal measuring step further comprises measuring a frequency of an optical output of the sensor over time.

8. The method according to claim 1, wherein:
the connecting step further comprises connecting the light source to multiple ones of the sensors;
the low frequency signal measuring step further comprises measuring relatively low frequency signals at each of the sensors by transmitting light from the light source through each of the sensors, the light output from the light source being swept over the range of wavelengths; and
the high frequency signal measuring step further comprises measuring relatively high frequency signals at each of the sensors by transmitting light from the light source through each of the sensors, the light output from the light source being maintained at the relatively constant wavelength.

9. The method according to claim 1, wherein the signal is a pressure signal.

10. A fiber optic sensor system for use in measuring relatively low frequency and relatively high frequency signals, the system comprising:
at least one interferometric fiber optic sensor exposed to both of the relatively low and high frequency signals; and
a variable wavelength light source connected to the sensor, the light source transmitting a sweep of light wavelengths through the sensor and transmitting a relatively constant wavelength through the sensor, the relatively low frequency signal being measured during the transmission of the sweep of light wavelengths, and the relatively high frequency signal being measured during the transmission of the relatively constant wavelength.

11. The system according to claim 10, wherein the light source alternately transmits the sweep of wavelengths and the relatively constant wavelength through the sensor.

12. The system according to claim 10, further comprising an opto-electric converter connected to an optical output of the sensor.

13. The system according to claim 12, wherein an electrical output of the converter is input to a computer which is connected to the light source, the computer controlling the wavelength of the light output by the light source.

14. The system according to claim 10, wherein the sensor includes an interferometer having two optical paths, one of the optical paths changing in length in response to a change in a parameter sensed by the sensor.

15. The system according to claim 14, wherein the interferometer is a selected one of a Mach-Zehnder and a Michelson interferometer.

16. The system according to claim 10, wherein the light source is a tunable laser.

17. The system according to claim 10, further comprising multiple ones of the sensor, and wherein the light source transmits the sweep of light wavelengths through each of the sensors and transmits the relatively constant wavelength through each of the sensors.

18. A fiber optic sensor system for use in measuring relatively low frequency and relatively high frequency pressure signals in a subterranean well, the system comprising:
at least one interferometric fiber optic sensor exposed to both of the relatively low and high frequency pressure signals in the well; and
a variable wavelength light source connected to the sensor, the light source transmitting a sweep of light wavelengths through the sensor and transmitting a relatively constant wavelength through the sensor, the relatively low frequency signal being measured during the transmission of the sweet of light wavelengths, and the relatively high frequency signal being measured during the transmission of the relatively constant wavelength.

19. The system according to claim 18, wherein the light source alternately transmits the sweep of wavelengths and the relatively constant wavelength through the sensor.

20. The system according to claim 18, further comprising an opto-electric converter connected to an optical output of the sensor.

21. The system according to claim 20, wherein an electrical output of the converter is input to a computer which is connected to the light source, the computer controlling the wavelength of the light output by the light source.

22. The system according to claim 18, wherein the sensor includes an interferometer having two optical paths, one of the optical paths changing in length in response to a change in pressure applied to the sensor.

23. The system according to claim 22, wherein the interferometer is a selected one of a Mach-Zehnder and a Michelson interferometer.

24. The system according to claim 18, wherein the light source is a tunable laser.

25. The system according to claim 18, further comprising multiple ones of the sensor, and wherein the light source transmits the sweep of light wavelengths through each of the sensors and transmits the relatively constant length through each of the sensors.

* * * * *

UNITED STATES PATENT AND TRADEMARK OFFICE
CERTIFICATE OF CORRECTION

PATENT NO.        : 6,747,743 B2
APPLICATION NO.   : 10/008503
DATED             : June 8, 2004
INVENTOR(S)       : Neal G. Skinner, John R. Dennis and Michel Leblanc It is certified that error appears in the above-identified patent and that said Letters Patent is hereby corrected as shown below:

Col. 6
Claim 18, line 29, cancel "sweet" and insert in place thereof -- sweep --:
Claim 25, line 55, cancel "length" and insert in place thereof -- wavelength --:

Signed and Sealed this
Tenth Day of April, 2012

David J. Kappos
*Director of the United States Patent and Trademark Office*